(No Model.)

H. & A. H. STEVENSON.
FANCY BOX.

No. 571,206. Patented Nov. 10, 1896.

Witnesses
H. van Oldenneel
E. A. Scott

Inventors
Hugh Stevenson
Albert Hugh Stevenson
by Richardson
Attorneys

United States Patent Office.

HUGH STEVENSON AND ALBERT H. STEVENSON, OF MANCHESTER, ENGLAND.

FANCY BOX.

SPECIFICATION forming part of Letters Patent No. 571,206, dated November 10, 1896.

Application filed July 16, 1896. Serial No. 599,424. (No model.) Patented in England October 4, 1895, No. 18,541.

*To all whom it may concern:*

Be it known that we, HUGH STEVENSON and ALBERT HUGH STEVENSON, subjects of the Queen of Great Britain, and residents of Silver Street, Manchester, in the county of Lancaster, England, have invented certain new and useful Improvements in the Manufacture of Fancy Boxes, (for which we have obtained Letters Patent in Great Britain, No. 18,541, bearing date October 4, 1895,) of which the following is a specification.

Our invention relates to improvements in the manufacture of those fancy boxes, such as chocolate, bonbon, and like boxes, in which paper-lace or plain flies, lock-labels, or other similar strips of paper or material which only require partial gumming are attached, and is particularly applicable to machine-made boxes. Hitherto such strips have been separately attached prior to the "banding" operation; and our improvements consist, essentially, in attaching the "fly" or like strip and the banding or covering strip simultaneously and by one operation; and in order that our invention may be fully understood and readily carried into effect we will describe the accompanying sheet of drawings, reference being had to the letters marked thereon.

Figure 1:
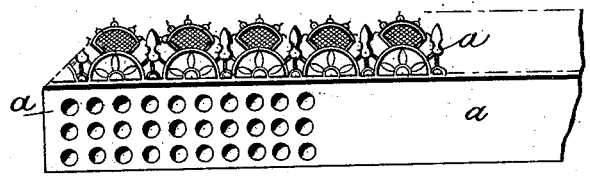
Figure 2:
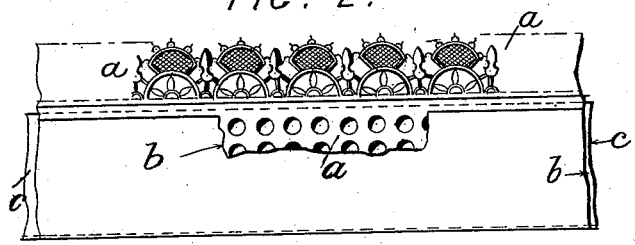
Figure 3:
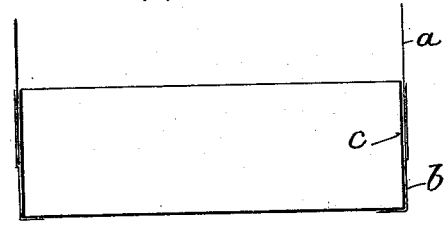

Figure 1 is a view of a paper-lace fly with its strip prepared for the purposes of our invention. Fig. 2 is a view of part of a fancy box to which the fly and banding strips have been attached simultaneously and by one operation according to our invention, part of the banding-strip being removed to show the fly in position. Fig. 3 is a cross-section of Fig. 2.

In the views, $a$ designates the fly, $b$ the banding or covering strip, and $c$ the cardboard or other material of which the fancy box is composed.

We carry our improvements into effect by perforating (for example, in the manner shown in Fig. 1) or slotting, serrating, or otherwise suitably treating that part of the fly $a$ or like strip which is usually first gummed and attached to the box $c$ and is then covered by the banding-strip $b$, and in the case of machine-made boxes we pass the fly-strip $a$, prepared as described and illustrated, through a banding-machine of the ordinary or any known construction simultaneously with the banding-strip $b$, which is gummed all over on one side in the usual way well understood by fancy-box makers.

The banding-strip $b$, as shown clearly in Figs. 2 and 3, overlaps the prepared portion of the fly-strip $a$, and the gum on the former passes through the perforations, slots, openings, serrated edges, or the like in the fly-strip $a$, so that the two are secured simultaneously and by one and the same operation to the box.

Having now particularly described and ascertained the nature of our said invention and in what manner the same is to be performed, we declare that what we claim, and desire to secure by Letters Patent of the United States, is—

In combination, a box $c$, a fly-strip comprising a perforated base and a projecting portion, and a banding-slip $b$ covering said perforated portion, substantially as described.

In witness whereof we have hereunto set our hands in presence of two witnesses.

HUGH STEVENSON.
ALBERT H. STEVENSON.

Witnesses:
  H. B. BARLOW,
  S. D. GILLETT.